United States Patent
Olewicz (10) Patent No.: US 6,688,881 B1
(45) Date of Patent: Feb. 10, 2004

(54) TORCH MOUNT FOR HIGH DEPOSITION GLASS TORCHES

(75) Inventor: Tadeusz Olewicz, Hoschton, GA (US)

(73) Assignee: Fitel USA Corp., Norcross, GA (US)

( * ) Notice: Subject to any disclaimer, the term of this patent is extended or adjusted under 35 U.S.C. 154(b) by 53 days.

(21) Appl. No.: 10/215,837

(22) Filed: Aug. 9, 2002

(51) Int. Cl.⁷ .............................................. F23D 11/36
(52) U.S. Cl. ..................... 431/343; 431/153; 431/159; 431/354
(58) Field of Search ................................. 431/343, 159, 431/153, 154, 155, 345, 354, 350; 65/397, 414, 412, 499, 507, 382, 416, 424

(56) References Cited

U.S. PATENT DOCUMENTS

| | | | |
|---|---|---|---|
| 4,627,866 A | * 12/1986 | Kanamori et al. | 65/397 |
| 4,689,065 A | * 8/1987 | Krause | 65/407 |
| 5,345,928 A | * 9/1994 | Lindkvist | 128/203.12 |
| 5,542,841 A | * 8/1996 | Nakashima et al. | 431/160 |
| 6,089,858 A | * 7/2000 | Loiselet et al. | 431/186 |
| 6,142,765 A | * 11/2000 | Ramaseder et al. | 431/9 |

FOREIGN PATENT DOCUMENTS

JP 3-69527 * 3/1991

* cited by examiner

Primary Examiner—James C. Yeung
(74) Attorney, Agent, or Firm—Thomas, Kayden, Horstemeyer & Risley, LLP (57) ABSTRACT

A torch and mounting system therefor has a cylindrical main glass tube surrounded by a tough and rigid tube. The metallic tube is threaded at each end for receiving compression nuts, each having a ferrule such as an O-ring or a tapered ring inside. Each ferrule is a slip fit over the main glass tube and has an angled surface that butts against the end of the metallic tube. When the nuts are tightened, the sloped surfaces of the ferrules force the ferrules against the main glass tube, thereby fixing it in place within the metal tube. The metal tube in turn is clamped by a mounting clamp which is, in turn, mounted to an adjustment stage for optimum positioning of the torch. A support rail has adjustably mounted thereon one or more strain relieving clamps for holding gas or vapor delivery tubes in place to insure proper delivery of gases and vapors to the torch.

23 Claims, 6 Drawing Sheets

TORCH MOUNT FOR HIGH DEPOSITION GLASS TORCHES

FIELD OF THE INVENTION

This invention relates to a torch assembly for use in a vapor axial deposition (VAD) process in forming optical fiber glass preforms.

BACKGROUND OF THE INVENTION

In the fabrication of optical fibers, it is customary to create a preform, which is a long glass rod having a central core and which is, in effect, a magnified or enlarged version of the optical fiber to be drawn therefrom. The preform consists of an inner core and an external cladding having an index of refraction profile that reproduces the index profile of the drawn fiber.

There are three major processes for making preforms, the modified chemical vapor deposition (MCVD) process, the outside vapor deposition (OVD) process, and the vapor axial deposition (VAD) process. All of these processes utilize vapor deposition, in which a "soot" is deposited on the surface of a starting object such as the interior surface of a starter tube or a starting or target rod to form a glassy layer on the surface.

In the VAD process, silica vapors flowing through a heating torch deposit the desired silica particle layers on the rod. As the sooty particles build up to a desired diameter, the target rod is moved upward to make room for further growth, while the torch or torches are fixed in position. When the build-up or deposition is complete, the rod is removed and the resulting preform is sintered or consolidated into a solid preform.

Although the VAD process is widely used, in a production milieu, certain problems arise which prevent complete satisfaction with the method, more particularly, the apparatus. Thus, the glass torches, which must be precisely set for satisfactory and reproducible results, tend, over an extended period of use to become leaky, unstable, and not very consistent in producing repeatable results. For example, the various gases and vapors fed to the torch are generally transmitted through plastic tubing to Teflon fittings which, in turn, connect to the glass torch nipples. These Teflon fittings tend to loosen up over extended periods of use, which can, and often does, give rise to leakage, thereby destroying the calibrated delivery of the gases and vapors to the torch. The tendency to loosen is due, at least in part, to temperature fluctuations and also to lack of strain relief in the plastic delivery tubing. Lack of strain relief is a very important problem, since even small mechanical stress on the tubing can loosen the Teflon to glass interface and cause leaks. For example, during routine machine maintenance, the mechanic can accidentally push the tubing and thereby loosen the interface. A further problem, which can actually be more serious in that it can shut down the production line, is that heretofore the mounting of the tubular glass torch to the adjustable mounts, made necessary for precise positioning of the torch, can cause cracking or breaking of the glass of the torch, necessity replacement thereof, which can cause as much as a week's delay in production. The glass tube of the torch is, generally, clamped to the adjustment stages using a V-block type clamp. By nature, the glass torch is extremely delicate as well as expensive. In use, this type of clamping technique, if too tight a clamp can cause cracking or breakage of the glass and too loose a clamp results in process instability, thus a certain amount of operator skill is required in positioning and clamping the torch.

SUMMARY OF THE INVENTION

The present invention is a torch for use in, for example, the VAD process and includes a mounting assembly therefor which obviates the drawbacks of the prior art assemblies as discussed in the foregoing.

In a preferred embodiment of the invention, the glass torch comprises an outer main tubular body within which may be a plurality of coaxial glass tubular bodies of diminishing size for creating a plurality of gas and/or vapor delivery passages. Such nested nozzles are shown, for example, in U.S. Pat. No. 4,627,866 of Kanamori et al., and in accordance with the invention each of the concentric delivery passages is attached to Teflon fittings connected to glass nipples formed on the nested nozzles. The main tubular glass body is mounted within a metal or other rigid and non-fragile type material torch clamp tube and has an outer diameter less than the inside diameter of the torch clamp tube so that there is clearance therebetween. Within the torch clamp tube, at each end thereof, is a tapered or round ring or ferrule made of somewhat resilient and high temperature material, for example, Teflon, whose inner diameter is, preferably, a slip fit over the outer main glass torch tube, and which serve to hold the main glass tube in suspension within the clamp tube. Each end of the clamp tube has external threads formed thereon and first and second compression nuts are screwed thereon. The compression nuts, when tightened, bear against the ferrules to tend to push them longitudinally relative to the clamp tube. The tapered or round, where an O-ring is used, surface of the ferrules bears against the inner surface of the main tube ends causing them to exert an increasing clamping force on the main nozzle body, thereby affixing it concentrically in position within the clamp tube. The stress thus induced in the glass main nozzle of the torch is evenly distributed over an area around the entire torch periphery and is well below critical levels for glass. It has been found that hand tightening the compression nuts is more than adequate to secure the torch firmly within the glass clamp tube. Thus, the danger of too much stress being applied to the torch main tube even during temperature fluctuations, which could produce cracking or breaking, is no longer a consideration. The torch clamp tube, and not the thin glass tube, is used to mount the torch to the adjustment stages. The mounting arrangement of the invention, therefore, is more robust and safe, and provides several other benefits in addition to those just discussed. For example, the ferrule is made of elastic and resilient material such as Viton or Teflon, or other high temperature plastic and acts as a temperature compensating member during expansion and contraction of the glass and the metal. It also acts as a heat isolator allowing the gases within the torch to stay warm; acts as a vibration and shock isolator/damper, thereby protecting the glass torch; and it provides easy rotary and linear (in/out) coarse torch alignment adjustment.

Another feature of the preferred embodiment of the invention is directed to the mounting system for the torch and the torch clamp tube to the adjustment stages and to inclusion in the assembly of the gas delivery system. The mounting system comprises a torch support rail having tracks or slots machined or extruded therein holding strain relief clamps for the gas delivery tubing. The tracks in the support rail and the clamps make possible both longitudinal and lateral positioning of the strain relief clamps and, therefor, the gas delivery tubing. Each of the concentric torch nozzles has a nipple to which is attached a temperature compensating Teflon fitting, to which a gas delivery tube is connected. Adjustment of the position of each strain relieving clamp relieves its associated tubing of any kinks, sharp bends, or other stress inducing positions, and the Teflon fittings and glass nipples are isolated from the rest of the system by the clamping action of strain relieving clamps.

At one end (the large torch end) of the rail member is mounted to a support block or bottom clamp having an arcuate section for receiving the torch clamp tube which is clamped therein by a top clamp half, thus holding the torch clamp tube. A second mounting clamp grips the torch clamp tube and is mounted to a mounting stage for coarse longitudinal adjustment of the torch position. At the opposite or rear end of the rail member is a rear mounting tube plate which has a bore therein through which a single, axially aligned supply tube passes to a Teflon fitting and a longitudinally extending torch glass nipple. The bore has a strain relieving clamp surrounding it for clamping the supply tube in position. As will be apparent hereinafter, the strain relieving clamps for the supply tubes are angled in a manner to position the tubes optimally as they lead into the corresponding Teflon fittings. Thus the tubes are fixed in position without inducing any stress on the tubing and fittings, so that leakage at the fittings does not result as the assembly is moved or during machine maintenance.

As a consequence of the unique assembly construction, uniform clamping pressure is placed on the glass torch body, thereby lessening the occurrence of cracking or breaking; the assembly is robust and stable and much more immune to the effects of continued use, and of temperature fluctuations; the torch mount is in effect temperature compensated, and all glass to pipe fittings are virtually leak proof; and no load is placed upon the glass nipples, thereby eliminating the risk of cracking or torch damage.

These and other features and advantages of the invention will be more readily apparent from the following detailed description, read in conjunction with the accompanying drawings.

DETAILED DESCRIPTION

Figure 1:
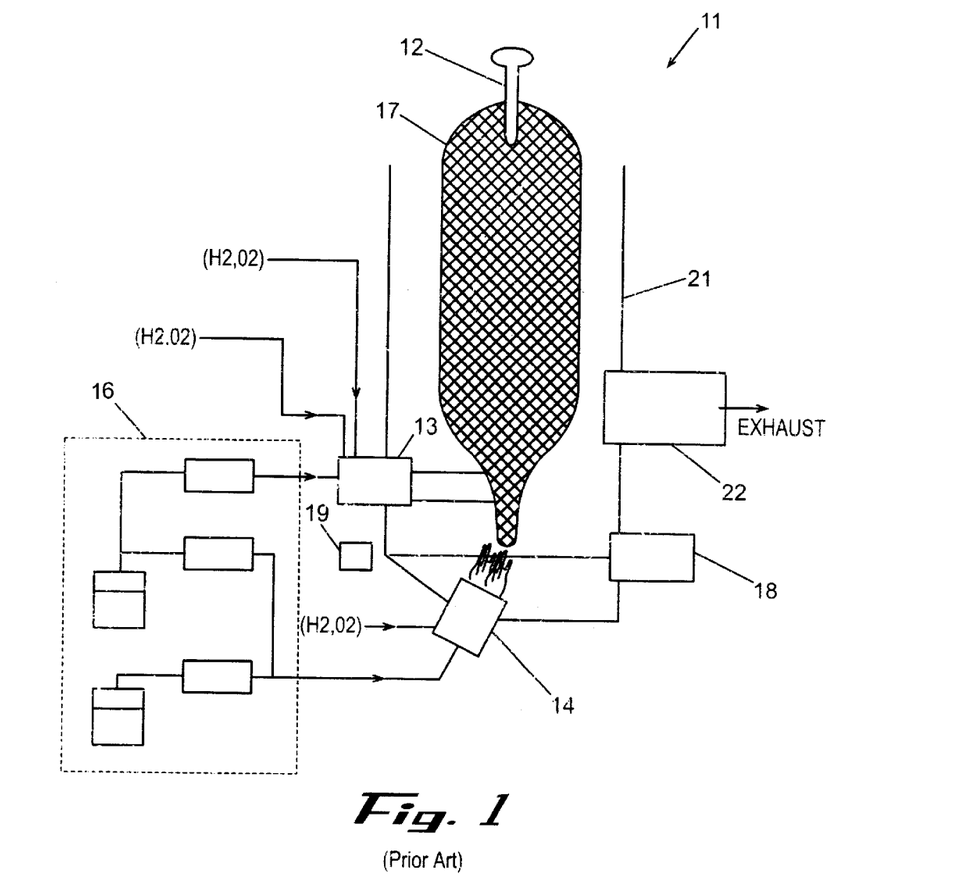
FIG. 1 is a schematic depiction of a VAD system.

FIG. 1 is a schematic view of a VAD system 11 comprising a starting rod 12, which may be of silica glass, one end of which is mounted in a chuck (not shown) and rotated as indicated by the arrow. Initially the end of the rod is directly in the flame of one or more oxygen-hydrogen torches 13 and 14. Vapors from a chemical delivery system 16, shown in dashed lines, flow into and through the glass torches 13 and 14 where they react via flame hydrolysis to form submicroscopic particles which are deposited on the starting rod 12. As the sooty particles build up, the starting rod 12 is moved upward to make room for new growth and continuously rotate to maintain cylindrical symmetry. A position control comprising, for example, a laser 18 and detector 19 may be used to insure proper location of the flame from the torches relative to the starting rods, and, where the torch and rod combination is contained in a housing 21, a housing exhaust 22 may be, and usually is, included. After a soot preform 17 of proper size is built, it is removed from the chuck, dehydrated, and the preform 17 is consolidated, which removes trapped gases and water vapor, to produce a solid glass preform 17 ready for subsequent operations, such as, for example, rod in tube formation and then drawing into fiber.

Figure 2:
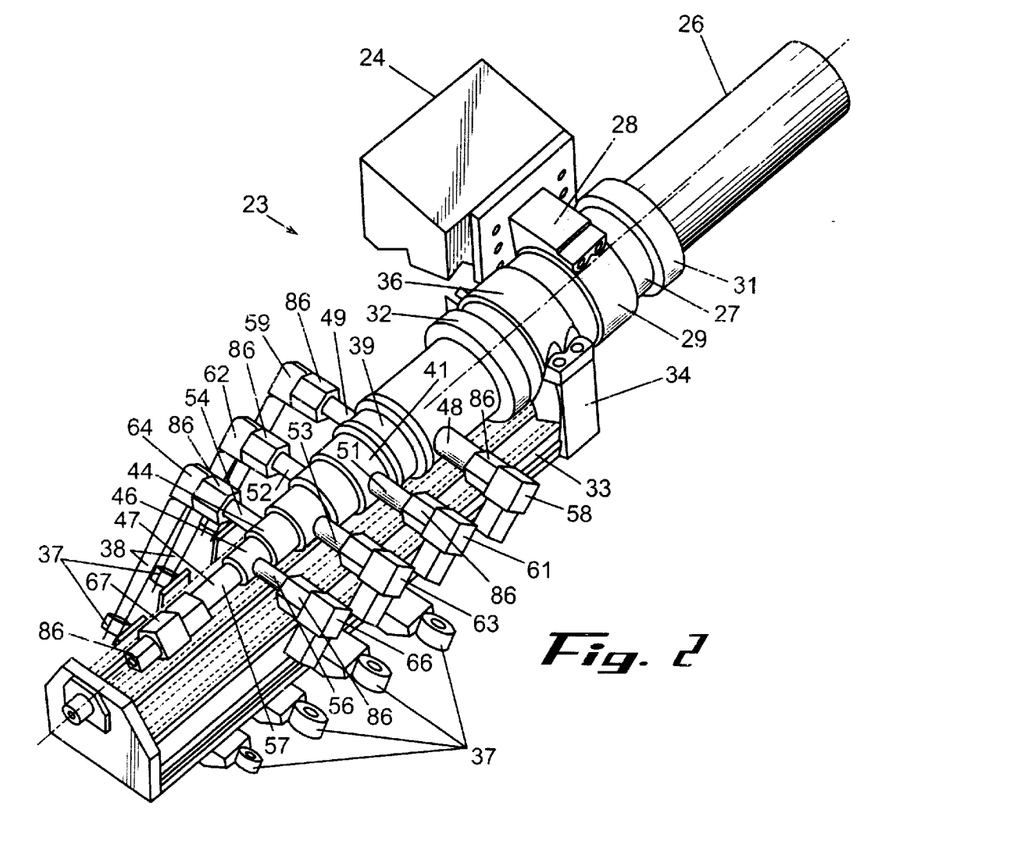
FIG. 2 is a perspective view of the VAD torch and mounting assembly of the present invention.

As discussed hereinbefore, during production runs over extended periods of time, numerous problems arise, and it is to the reduction or elimination of these problems that the present invention is addressed. FIG. 2 is a perspective view of the VAD torch 23 of the present invention, shown mounted to an adjusting stage 24 for proper positioning of the torch 23. Torch 23 comprises a main glass tubular member 26 which, as will be discussed in greater detail hereinafter, is contained in a clamping tube or sleeve 27 of suitable signed and non-fragile material, preferably aluminum, which does not tend to contaminate glass, even at elevated temperatures. As will be apparent hereinafter, the clamping sleeve 27, which is mounted to the adjusting stage 24 by a two piece clamp having a bottom portion 28 and a top portion 29, effectively isolates the main glass tubular member 26 from high mounting clamping pressures, thereby protecting it from possible breakage. Each end of the clamping sleeve or the tube is threaded to receive nuts 31 and 32, the function of which will be discussed hereinafter.

An elongated support rail 33 is mounted to the clamping sleeve 27 by a two part support clamp comprising a bottom portion 34 and a top portion 36 and functions to support, a plurality of strain relieving side tube clamps 37, which hold the numerous gas and vapor delivery tubes, such as tube 38, without stressing or other undue distortion, with both transverse and longitudinal adjustment.

Figure 3:
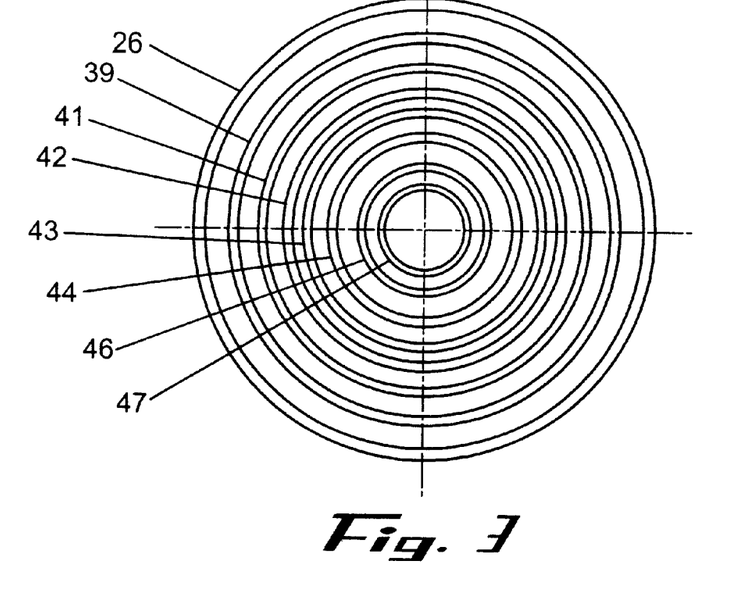
FIG. 3 is a cross-sectional end view of an array of glass tubes usable in the torch of the invention.
Figure 4:
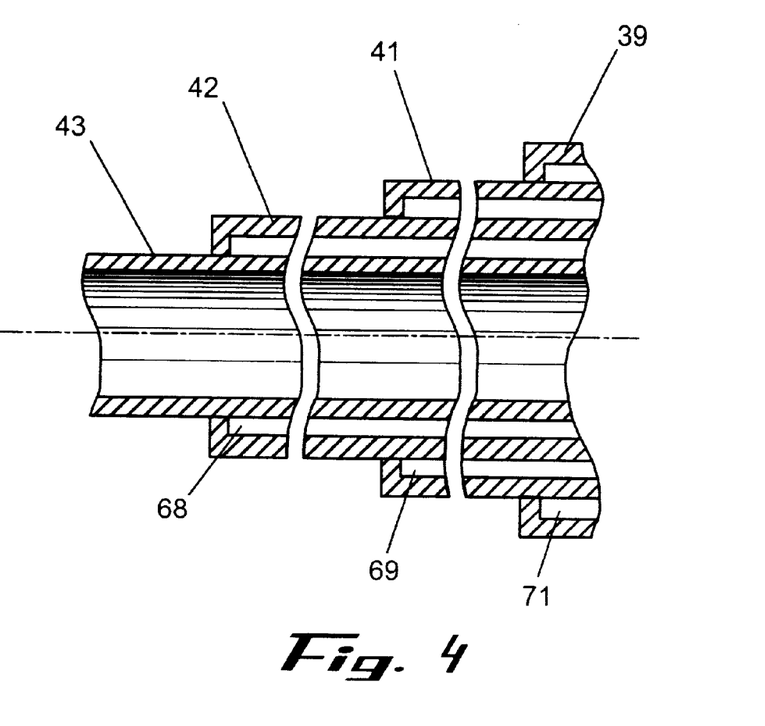
FIG. 4 is a cross-sectional elevation view of a portion of the secondary glass tube arrangement of the torch of the invention.

In the VAD process, it is usual that several gases, such as oxygen and hydrogen (for the burner flame), and several soot or vapor mixtures are applied through the torch 23 to the starting rod 12 and the preform 17 during the deposition operation. To this end, there is a plurality of nested secondary glass tubes 39, 41, 42, 43, 44, 46, and 47. Main glass tubular member 26 and each of the secondary tubes has a vapor (or gas) delivery nipple, 48, 49, 51, 52, 53, 54, 56, and 57 respectively, to which is mounted a temperature compensating fitting to which are attached the gas or vapor delivery tubes 38, only one of which is shown. The fittings form substantially leak proof connections to the nipples. This nesting of the secondary tubes as shown in FIG. 3 is shown and explained in U.S. Pat. No. 4,627,866 of Kanamari et al. FIG. 4 is a cross-sectional diagram of a portion of the nested tubes of FIGS. 2 and 3, demonstrating how each tube supports the next outer tube and provides vapor or gas annular delivery nozzles 68, 69, and 71. Each pair of adjacent rings forms such an annular delivery nozzle to which the respective nipples, integral with its tube, are connected. The smallest diameter secondary tube 47 is its own nipple 57, and is connected to an in line temperature compensating fitting 67.

Figure 5:
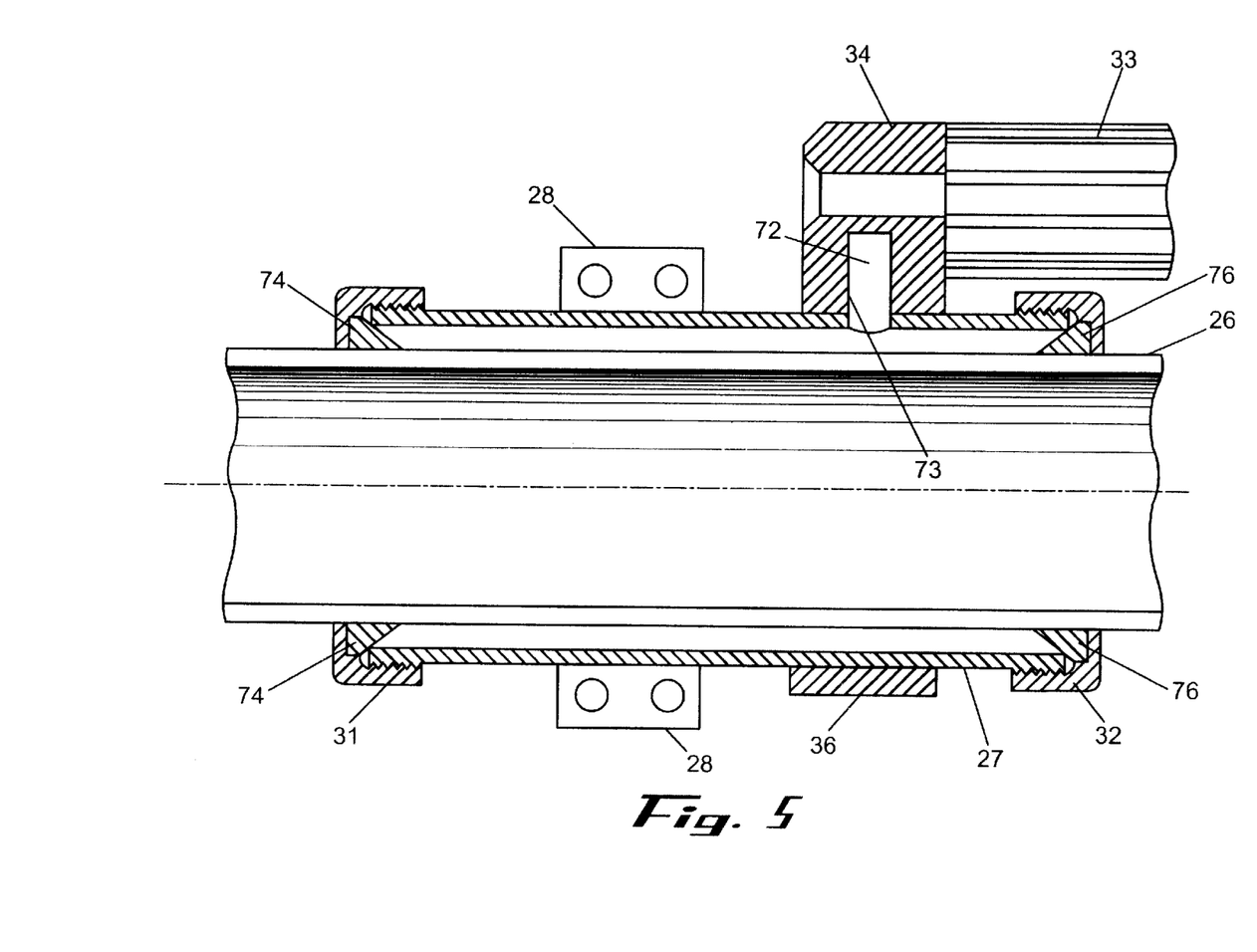
FIG. 5 is a cross-sectional view of the mounting arrangement of the invention for the main glass tube of the torch.
Figure 6:
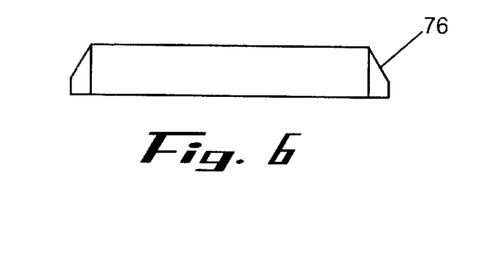
FIG. 6 is a cross-sectional elevation view of the typical mounting ferrule of the invention.
Figure 7:
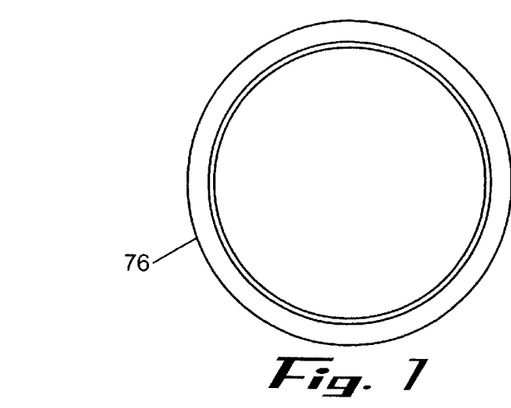
FIG. 7 is a plan view of the ferrule of FIG. 6.

FIG. 5 is a cross-sectional view of the mounting arrangement for the main glass tubular member 26 of the torch of the invention. As can be seen in FIG. 5, the clamping sleeve or tube 27, which is preferably made of aluminum, has an inside diameter that is greater than the outside diameter of the tubular member 26. Sleeve 27 is, as discussed in connection with FIG. 2, mounted to adjusting stage 24 by means of a clamp which comprises a bottom portion 28 and a top portion 29 (not shown). Also, support rail 33 is mounted or affixed to sleeve 27 by bottom portion 34 and top portion 36 of a clamp member. A locating pin 72 which fits within a hole 73 in sleeve 27 serves to maintain sleeve 27 and support rail 33 in fixed relationship. At each end of sleeve 27 is a compressible mounting ferrule 74 and 76, each having at least a portion of its outside diameter tapered, as best seen in FIGS. 5 and 6, it is also possible to use O-rings and to taper the inside lip of the sleeve 27. Each of ferrules 74 and 76 is preferably made of Teflon or Viton and is a light slip fit on main tubular member 26 and the tapered surface thereof bears against the corresponding end of sleeve 27. The outside surface of sleeve 27 at each end thereof is threaded to receive a compression member such as threaded nut 31 and 32 the inner end of which bears against the rear surface of mounting ferrule 74 or 76, as seen in FIG. 5. Nuts 31 and 32 may be made of suitable material such as aluminum or brass. As the nut 31 or 32 is tightened, the tapered surface of the corresponding mounting ferrule 74 or 76 is forced against the corresponding end of sleeve 27, thereby applying a radial inward pressure on tubular member 26. As pointed out hereinbefore, hand tightening of the nuts 31 and 32 is sufficient to cause tubular member 26 to be firmly held within sleeve 27, without the danger of cracking or breaking. In addition, the thermal expansion and mechanical properties of the ferrules cause them to act as a temperature compensating member between the aluminum sleeve and the glass tube. Since the coefficient of thermal expansion of glass is $\sim 3-6^{10-6}$ in/in/°F. the Teflon is $\sim 47-55^{10-6}$ in/in/°F and brass/aluminum is $\sim 9-13^{10-6}$ in/in/°F. one can see that the Teflon will expand the most. Since aluminum is on the outside, it will limit the expansion and the Teflon will be forced toward the glass. Since it is ductile, once against the glass, it expands axially, thus maintaining a tight connection.

Figure 8:
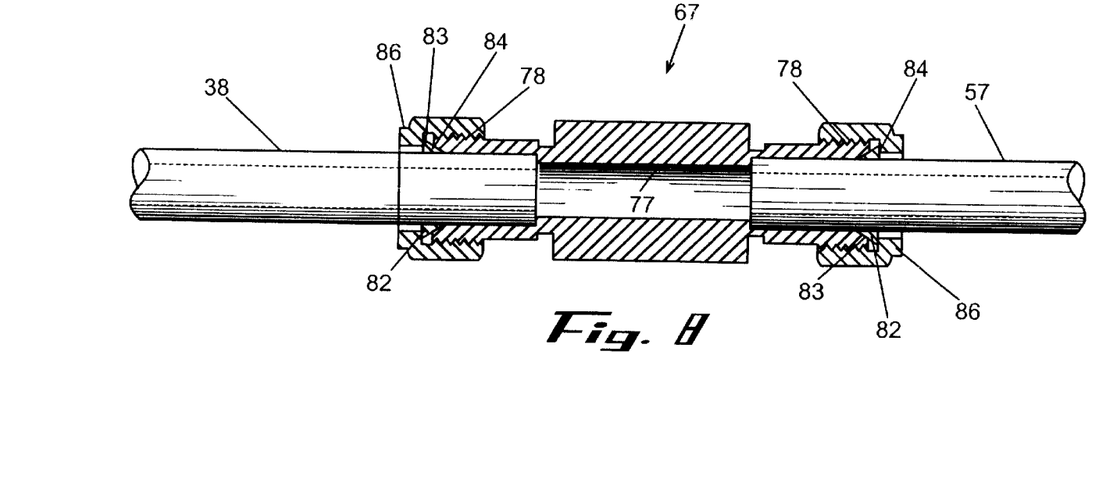
FIG. 8 is a cross-sectional view of a gas or vapor delivery fitting of the invention.

A similar clamping arrangement is subject to temperature fluctuations, such as Teflon fitting 67, as shown in FIG. 8, which is a cross-sectional view of the fitting 67. Inasmuch as both ends of the fitting are substantially identical, corresponding parts at each end bear the same reference numerals. Fitting 67 is mounted on nipple 57 of secondary tube 47, and has a bore 77 extending therethrough and external threads 78 at the nipple receiving end thereof and at the gas delivery tube 38 end. A mounting ferrule 82, which is virtually a miniature version of tapered ferrule 76, has a sloped or angled surface 83 adapted to bear against a sloped surface 84 of bore 77 when the ferrule 82 is mounted on nipple 57, as shown. A compression nut 86 screws onto the threaded portion of bore 77 and the end thereof bears against the back of ferrule 82, as shown. During operation, fitting 67 is subjected to wide swings in temperature which will cause it, over time, to loosen on nipple 57, thereby creating possible leakage. Teflon expands with heat more than glass, and this differential expansion can cause the leakage, as well as altering the grip of ferrule 82 on nipple 57. In such case, compression nut 86 can be forced against the rear of ferrule 82, and the angled surfaces 83 and 84 will force ferrule 82 into tighter gripping engagement with nipple 57 sufficiently to eliminate the leaks. Bolt 86 is preferably made of a material such as stainless steel, which expands less with temperature than does Teflon, thus, when screwed into contact with ferrule 82 to force a tighter grip on nipple 57, it tends to maintain the grip because of the lesser expansion change of the bolt 86. In the same manner, gas delivery tube 38 is retained in fitting 67, and it is to be understood that other arrangements for preventing leakage might also be used.

The same leakage prevention scheme may be used with the other fittings 58, 61–64, and 66, however, these fittings are not heated and are less prone to developing leaks inasmuch as they are not subjected, in the configuration shown in FIG. 2, to temperatures fluctuations.

Figure 9:
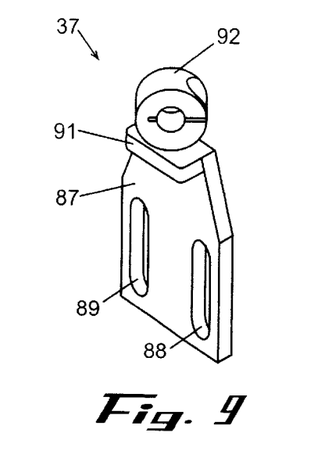
FIG. 9 is a perspective view of a side tube strain relief clamp of the invention.
Figure 10:
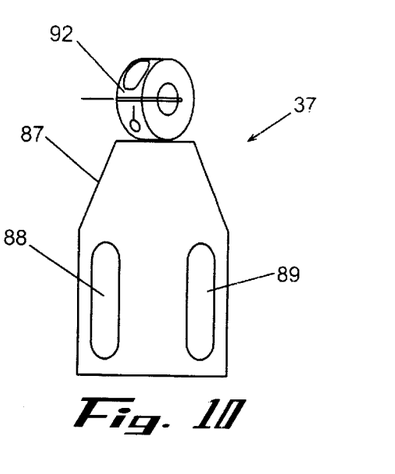
FIG. 10 is an elevation view of the right hand version of the clamp of FIG. 9.
Figure 11:
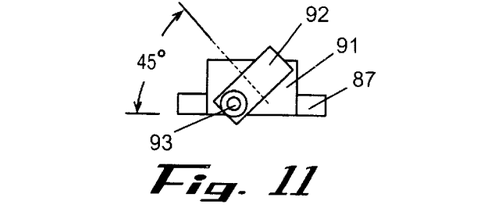
FIG. 11 is a top plan view of the clamp of FIG. 9.

FIG. 9 is a perspective view of a side tube strain relief clamp 37 and FIG. 10 is an elevation view thereof. As pointed out hereinbefore, clamp 37 is designed to position and hold a gas or vapor delivery tube (such as tube 38) so that there is no stress in the Teflon tubing between the strain relief and the Teflon fitting, thereby insuring a smooth vapor (or gas) delivery to the associated nozzle. Also, the second function of the strain relief is to isolate and protect the glass torch nipple from accidental Teflon tubing movement during torch adjustment or machine maintenance, which could potentially cause nipple cracking or breakage. To this end, clamp 37 comprises a plate member 87 having first and second elongated slots 88 and 89 therein, and an extension 91 upon which is mounted as by welding, preferably at a 45° angle, as shown in FIG. 11, a split C-clamp collar 92. C-clamp collar 92 is designed to grip a gas or vapor delivery tube, such as tube 38 shown in FIG. 2, and has an adjusting clamp bolt 93 for optimum gripping force. Plate 87 and clamp 92 are preferably made of stainless steel, although other suitable materials might readily be used.

Figure 12:
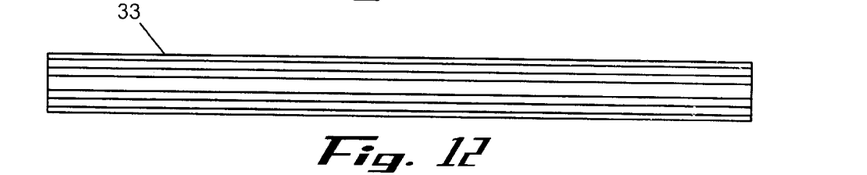
FIG. 12 is a side elevation view of the support rail of the invention.
Figure 13:
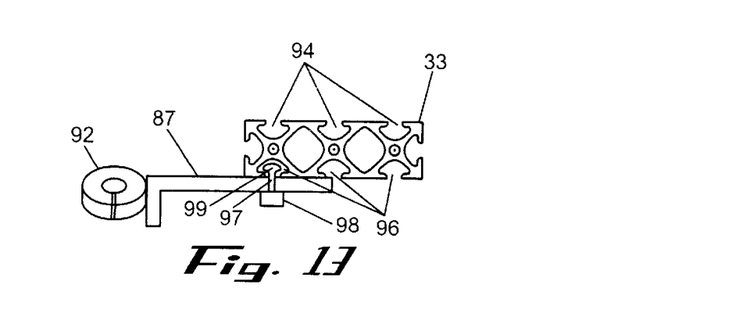
FIG. 13 is an end view of the support rail of FIG. 12.

As shown in FIG. 2, the clamps 37 are mounted on support rail 33, which is shown in greater detail in FIGS. 12 and 13, of which FIG. 12 is a side elevation view and FIG. 13 is an end elevation view thereof. As best seen in FIG. 13, rail 33 comprises three X-shaped sections which form three top tracks 94 and three bottom tracks 96, which extend the length of rail 33. The mounting for clamp 37 on support rail 33 is shown in FIG. 13 and comprises a bolt 97 which extends through one of the slots 88 or 89, with its head 99 riding in and free to move in an enlarged section of a track 96, and having an adjustable nut 98 for clamping plate 87 to rail 33 by preventing further movement of the bolt 97 in track 96. It can be appreciated that slots 88 and 89 permit a great deal of lateral movement of clamp 37 when bolt 97 is loosened, as well as longitudinal movement along track 33. After the desired lateral and longitudinal positions of clamp 37 are realized, bolt 97 is tightened by nut 98 and clamp 37 is firmly fixed in place. A certain amount of angular positioning of clamp 37 is also realizable when bolt 97 is loosened.

From the foregoing description of the preferred embodiment of the invention, it can be seen that the torch and mounting arrangement of the invention inherently prevents the application of excessive clamping forces on the glass torch body; that the assembly is both robust and stable and hence less subject to the affects of continued use and excessive temperatures, as well as temperature fluctuations; and that all glass to pipe fittings are virtually leak proof, and not subject to breakage due to accidental Teflon tubing movement.

It is to be understood that the various features of the present invention, as set forth, might be incorporated into other types of torch arrangements and that other modifications and/or adaptations might occur to workers in the art. All such variations and/or modifications are intended to be included herein as being within the scope of the present invention as set forth. Further, in the claims hereinafter, the corresponding structures, materials, acts, and equivalents of all means or step-plus-function elements are intended to include any structure, material, or acts for performing the functions in combination with other elements as specifically claimed.

What is claimed is:

1. A torch and mount assembly therefor, wherein the torch has a cylindrical main glass tube comprising:
   a torch clamping tube having an interior diameter greater than the outside diameter of the main glass tube and surrounding the main glass tube;
   first and second compressible members bearing against the glass tube at each end of said clamping tube;
   each of said members bearing against the respective end of said clamping tube; and
   a compression member bearing against each of said first and second compressible members for forcing the member against the corresponding end of the clamping tube to force the compressible member into tight engagement with the main glass tube.

2. A torch and mounting assembly as claimed in claim 1 wherein said compressible members each has an angled face.

3. A torch and mounting assembly as claimed in claim 1 wherein said clamping tube is made of aluminum.

4. A torch and mounting assembly as claimed in claim 1 wherein said first and second compressible members are made of Teflon.

5. A torch and mounting assembly as claimed in claim 1 wherein each end of said clamping tube has external threads thereon.

6. A torch and mounting assembly as claimed in claim 5 wherein said compression members are internally threaded nuts for engagement with said external threads.

7. A torch and mounting assembly as claimed in claim 1 wherein said compression members are made of aluminum.

8. A torch and mounting assembly as claimed in claim 1 and further comprising a first clamping and mounting member for gripping said torch clamping tube for mounting the torch to a torch adjustment stage.

9. A torch and mounting assembly as claimed in claim 8 wherein said first clamping member is made of aluminum.

10. A torch and mounting assembly as claimed in claim 1 and further comprising a support clamp clamped to said torch clamping tube and an elongated support rail affixed to and supported by said support clamp.

11. A torch and mounting assembly as claimed in claim 10 wherein said torch clamping tube has as locating hole therein and said support clamp has a locating pin therein adapted to fit within said locating hole to prevent rotation of said support rail relative to said torch clamping tube.

12. A torch and mounting assembly as claimed in claim 10 wherein said support rail has a plurality of longitudinally extending tracks therein.

13. A torch and mounting assembly as claimed in claim 12 and further including at least one secondary glass tube within said main glass tube, said main glass tube and said secondary glass tube having gas or vapor receiving nipples thereon to which are connected temperature compensating fittings for connecting said nipples to gas or vapor delivery tubes.

14. A torch and mounting assembly as claimed in claim 13 wherein said fittings are of a material such as Teflon.

15. A torch and mounting assembly as claimed in claim 13 wherein each of said fittings is adapted to receive a gas or vapor delivery tube.

16. A torch and mounting assembly as claimed in claim 12 and further including at least one strain relieving clamp movably mounted in one of said longitudinally extending tracks for gripping a gas or vapor delivery tube and positioning it in an optimum kink free position relative to its corresponding fitting.

17. A torch and mounting assembly as claimed in claim 16 wherein each of said strain relieving clamps comprises a plate member having at least one mounting slot therein for receiving a bolt for allowing movement of said strain relieving clamp when tightened.

18. A torch and mounting assembly as claimed in claim 17 wherein an adjustable C-clamp for gripping a gas or vapor delivery tube is mounted on said plate member.

19. A torch and mounting assembly as claimed in claim 18 wherein said C-clamp is made of stainless steel.

20. A torch and mounting assembly as claimed in claim 13 wherein at least one of said secondary tubes has a nipple extending axially therefrom, a fitting having a compressible member bearing against said nipple, and an adjustable compression member for bearing against said compressible member for forcing said compressible member into tight, substantially leak proof engagement with said nipple.

21. A torch and mounting assembly as claimed in claim 20 wherein said compressible member is a Teflon ferrule.

22. A torch and mounting assembly as claimed in claim 20 wherein said compression member is a nut.

23. A torch and mounting assembly as claimed in claim 22 wherein said nut is made of stainless steel.

* * * * *